United States Patent
Padwekar (12)

(10) Patent No.: US 7,107,437 B1
(45) Date of Patent: Sep. 12, 2006

(54) BRANCH TARGET BUFFER (BTB) INCLUDING A SPECULATIVE BTB (SBTB) AND AN ARCHITECTURAL BTB (ABTB)

(75) Inventor: Kiran A. Padwekar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 09/608,852

(22) Filed: Jun. 30, 2000

(51) Int. Cl.
*G06F 9/00* (2006.01)
(52) U.S. Cl. ...................... 712/238; 712/237
(58) Field of Classification Search ............ 712/235, 712/237, 238, 239
See application file for complete search history.

(56) References Cited

U.S. PATENT DOCUMENTS

| | | | | |
|---|---|---|---|---|
| 5,515,518 A | * | 5/1996 | Stiles et al. | 712/239 |
| 5,553,255 A | * | 9/1996 | Jain et al. | 712/235 |
| 5,584,001 A | * | 12/1996 | Hoyt et al. | 712/238 |
| 5,732,253 A | * | 3/1998 | McMahan | 712/239 |
| 5,774,710 A | * | 6/1998 | Chung | 712/238 |
| 5,842,008 A | * | 11/1998 | Gochman et al. | 712/240 |
| 5,978,909 A | * | 11/1999 | Lempel | 712/240 |
| 6,067,616 A | * | 5/2000 | Stiles et al. | 712/239 |
| 6,185,668 B1 | * | 2/2001 | Arya | 712/23 |
| 6,321,328 B1 | * | 11/2001 | Karp et al. | 712/225 |
| 6,513,109 B1 | * | 1/2003 | Gschwind et al. | 712/200 |
| 6,553,488 B1 | * | 4/2003 | Yeh et al. | 712/239 |

* cited by examiner

*Primary Examiner*—Eddie Chan
*Assistant Examiner*—Aimee J. Li
(74) *Attorney, Agent, or Firm*—Blakely, Sokoloff, Taylor & Zafman LLP

(57) ABSTRACT

A method and apparatus are provided for improving the performance of branch prediction using a combination of a speculative branch target buffer (SBTB) and an architectural branch target buffer (ABTB). According to one embodiment, speculative branch data is maintained for in-flight branches (i.e., those that have been fetched but not yet retired). A branch entry is speculatively allocated in a line of the SBTB after decoding an instruction containing a branch, such as a conditional branch, a return from a subroutine, a call to a subroutine, or an unconditional branch. Subsequently, the branch data associated with the branch entry is speculatively updated after branch prediction has been completed for the branch. Finally, the branch data is corrected after the branch has been executed. According to another embodiment, a novel branch prediction circuit includes both a speculative branch target buffer (SBTB) cache and an architectural branch target buffer (ABTB) cache. The SBTB cache contains multiple branch entries to maintain speculative branch data associated with in-flight branches. The speculative branch data includes a speculative history of taken/not-taken outcomes associated with the in-flight branches. The ABTB cache is coupled to the SBTB cache. The ABTB cache also includes multiple branch entries, however, they are for maintaining architectural branch data including the actual taken/not-taken outcomes associated with retired conditional branches.

21 Claims, 7 Drawing Sheets

| Tag Field 310 | Block Offset 320 | Branch Type 330 | True History 340 | Speculative History 350 | History Selection Bit 370 | Valid Bit 380 | Branch Target Address 390 |

FIG. 3
*PRIOR ART*

BRANCH TARGET BUFFER (BTB) INCLUDING A SPECULATIVE BTB (SBTB) AND AN ARCHITECTURAL BTB (ABTB)

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of branch prediction. More specifically, the invention relates to the use of a Speculative Branch Target Buffer (SBTB) to maintain speculative branch data for in-flight branches.

2. Description of the Related Art

Early microprocessors generally processed instructions one at a time. Each instruction was processed using separate sequential stages (e.g., instruction fetch, instruction decode, execute, and result writeback). Within such microprocessors different dedicated logic blocks performed each different processing stage. Each logic block waited until all the previous logic blocks completed operations before beginning its operation To improve efficiency, microprocessor designers overlapped the operations of the logic blocks for the instruction processing stages such that the microprocessor operated on several instructions simultaneously. In operation, the logic blocks and hence the corresponding instruction processing stages concurrently process different instructions. At each clock tick, the result of each processing stage is passed to the subsequent processing stage. Microprocessors that use the technique of overlapping instruction processing stages are known as "pipelined" microprocessors. Some microprocessors further divide each processing stage into substages for additional performance improvement. Such processors are referred to as "deeply pipelined" microprocessors.

An example of a simplified instruction pipeline 100 is shown in FIG. 1. According to this simplified example, the instruction pipeline 100 comprises five major stages 105–125. The five major stages are the fetch stage 105, the decode stage 110, the dispatch stage 115, the execute stage 120, and the writeback stage (also referred to as the retirement stage) 125. Briefly, during the first stage, the fetch stage 105, one or more instructions are retrieved from memory, and subsequently decoded into micro-ops during the decode stage 110. Then, the micro-ops are dispatched to the appropriate execution unit for execution during the dispatch stage 115 and execution takes place during the execute stage 120. Finally, as the micro-ops complete execution, they are marked as being ready for retirement and are subsequently retired (e.g., their results are committed to the architectural registers) during the retirement stage 125. Consequently, the fetch unit (not shown) at the head of the pipeline provides the pipeline with a continuous flow of instructions, hence keeping the microprocessor busy. The fetch unit keeps the constant flow of instructions so the microprocessor does not have to stop its execution to fetch an instruction from memory. Such fetching guarantees continuous execution, as long as the instructions are stored in order of execution. However, due to branch instructions, such as conditional branch instructions included in software loops or conditional jumps, instructions encountered by the fetch unit are not always presented in a sequence corresponding to the order of execution. Thus, branch instructions can cause pipelined microprocessors to speculatively execute down the wrong path such that the microprocessor must later flush the speculatively executed instructions and restart at a corrected address.

As a result, many pipelined microprocessors employ branch prediction techniques to predict the outcome of branch instructions (e.g., determine which instruction to fetch next). Generally speaking, branch prediction seeks to guess whether or not a branch encountered in the instruction stream will be taken or not; and to fetch executable code from the appropriate location in the instruction stream. When a branch instruction is executed, it and the branch target address (i.e., the address of the of the instruction to be executed if the branch is taken) are stored in a branch target buffer (BTB). This and other information is subsequently used to predict which way the instruction will branch the next time it is executed. Mispredicted branches still cause the instruction pipeline to stall while the incorrect sequence of instructions that have been fetched and have begun execution are flushed from the instruction pipeline. However, when the branch prediction is correct (as it is over 90 percent of the time), executing a branch does not cause a pipeline stall as the processor may fetch and begin executing the proper sequence of instructions in advance.

An earlier branch target buffer cache implementation is illustrated in FIGS. 2 and 3. The branch target buffer (BTB) 200 depicted in FIG. 2 is a set-associative cache that stores information about branch instructions in 128 individual "lines" of branch information. Each line of branch information in the BTB 200 contains four branch entries that each contains information about a single branch instruction that the microprocessor has previously executed (if the valid bit is set in the entry). Each line also includes a branch pattern table 221 and least recently replaced (LRR) bits 220. The branch pattern table 221 is used for predicting the outcome of conditional branch instructions in the line of branch entries. The LRR bits 220 are used by the branch prediction circuit to select a branch entry in the line when information about a new branch will be written into the line of branch entries.

FIG. 3 illustrates the branch information stored within each branch entry of the BTB 200. As illustrated in FIG. 3, each branch entry contains a tag field 310, a block offset field 320, a branch type field 330, a true history field 340, a speculative history field 350, a history selection bit 370, a valid bit 380, and a branch target address field 390. The tag address 310 and the block offset 320 are used to identify a memory address of the branch instruction associated with the branch entry. The branch type field 330 specifies what type of branch instruction the branch entry identifies (e.g., conditional branch, return from subroutine, call subroutine, unconditional branch). The true history field 340 maintains the actual (fully-resolved) taken or not-taken history of the branch instruction for a predetermined number of prior executions. The speculative history field 350 maintains the "speculative" taken or not-taken history of the branch instruction for the predetermined number of prior executions. The history selection bit 370 indicates which of the true history field 340 or the speculative history field will be used to index into a pattern state table when calculating a branch prediction. The valid bit 380 indicates whether or not the branch entry contains valid branch information. The valid bit 380 is typically set during the execute or retirement stage when the branch prediction circuit allocates and fills the corresponding branch entry. The valid bit 380 is cleared when the branch entry is subsequently deallocated by the branch prediction circuit.

Because many of the fields (e.g., tag 310, valid 380, block offset 320, LRR 220, pattern table 221, true history 340, and speculative history 350) of the BTB 200 must be accessed by various pipeline stages the BTB 200 must include multiple ports for reading/writing the appropriate fields at prediction time and reading/writing the appropriate fields during allocation, update, and deallocation of branch entries.

In such a prior BTB 200, branch entries are typically allocated at execute or retire time to avoid allocating entries along a mispredicted path. This, however, results in mispredicting tight loops until they are allocated. For deallocation, two consecutive lines of instruction are deallocated when a bogus branch is encountered, resulting in deallocation of good branches. Finally, branches are typically updated at execute time instead of retirement to improve prediction. This, however, often results in corruption since not all executed branches retire.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 3 illustrates branch information stored within each branch entry of the BTB of FIG. 2.

DETAILED DESCRIPTION

Figure 1:
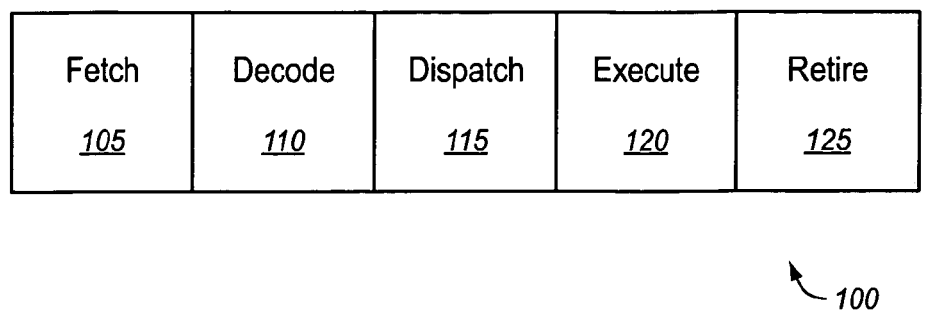
FIG. 1 illustrates a simplified instruction pipeline.
Figure 2:
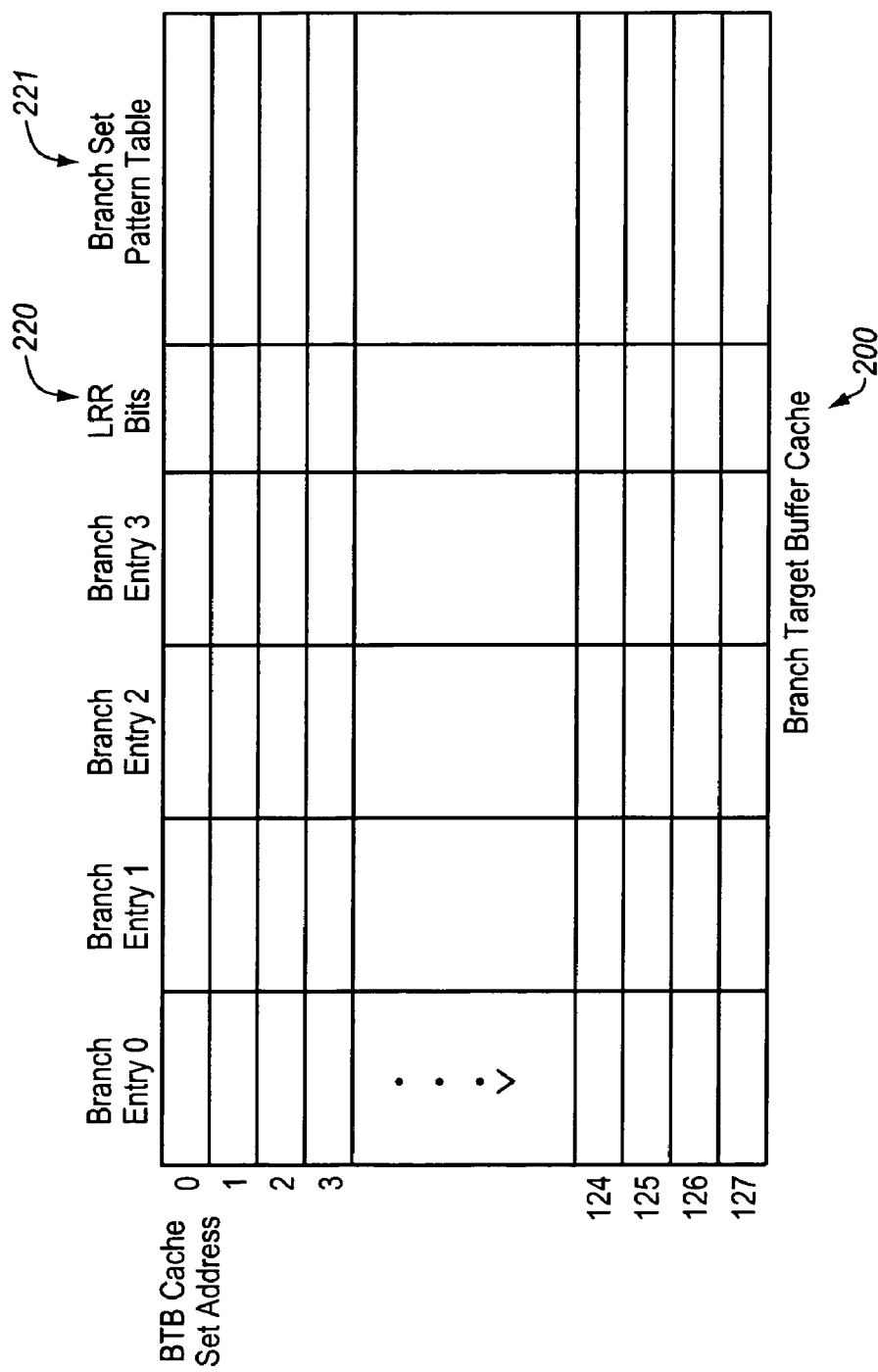
FIG. 2 illustrates a prior art branch target buffer (BTB) implementation.

A method and apparatus are described for improving the performance of branch prediction using a combination of speculative branch target buffer and architectural branch target buffer. According to one embodiment, a branch target buffer includes both a speculative branch target buffer (SBTB) and an architectural branch target buffer (ABTB). The SBTB may be implemented as a relatively small structure that supports the ABTB, and that can be used to maintain speculative branch data for in-flight branches (i.e., those that have been fetched but not yet retired). Thus, the ABTB need only store the architectural or actual branch data. The combination of ABTB and SBTB described herein seek to improve the cost and performance of branch prediction, which essentially lowers cost and improves performance of a microprocessor.

According to one embodiment, the SBTB allows the speculative history and the selection bit to be eliminated from the ABTB, and allows the ABTB to be single-ported, saving area that can be traded for performance. As will be described further below, branches can be allocated speculatively in SBTB at the time of decode, helping avoid misprediction in tight loop branches. Bogus branches are also deallocated at decode time. They are deallocated in the line containing the branch, and the next line only if it is a consecutive line thereby eliminating unnecessary deallocation.

The branch entry is updated speculatively at prediction time, and corrected at execution time in the SBTB, thereby reducing the number of ABTB accesses. Further, the branches may be updated in the ABTB only after the last of the branches in the line retire to reduce update traffic to the ABTB. Both of these make a single-ported ABTB possible. Finally, there is no corruption of branch data as a result of mispredicted branches because the update is at retire time.

According to one embodiment of the present invention, the method and apparatus consist of a SBTB having all entries searched in parallel to determine whether the set matches against a fetch instruction pointer (IP). The SBTB, a FIFO or circular buffer, allocates an entry when an instruction line containing a conditional branch is fetched and decoded, and deallocates it when the last branch in the line retires. The novel branch prediction is made based on the youngest (e.g., the most recently allocated or updated) of the entries in the ABTB or the SBTB. Branch allocation/deallocation is done at branch decode time on the SBTB, leaving the ABTB untouched. Speculative prediction is continuously made, assuming it is correct, for subsequent processing, until an actual entry is made in the architectural history. Further, any mispredicted entries are corrected at execution time on the SBTB, and branch update is done on the ABTB at retirement. The method is designed to reduce the cost of branch prediction and increase its performance. Hence, producing an efficient, yet affordable, microprocessor.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Importantly, the method and apparatus of the present invention conceptually operate at a layer above branch prediction. Therefore, while embodiments of the present invention will be described with reference to branch prediction algorithms employing pattern tables, the method and apparatus described herein are equally applicable to other branch prediction techniques, such as the Yeh algorithm (See Tse Yu Yeh and Yale N. Patt, "Two-Level Adaptive Branch Prediction," The $24^{th}$ ACM/IEEE International Symposium and Workshop on Microarchitecture, November 1991, pp. 51–61), and other static and dynamic branch prediction mechanisms.

Computer System Overview

Figure 4A:
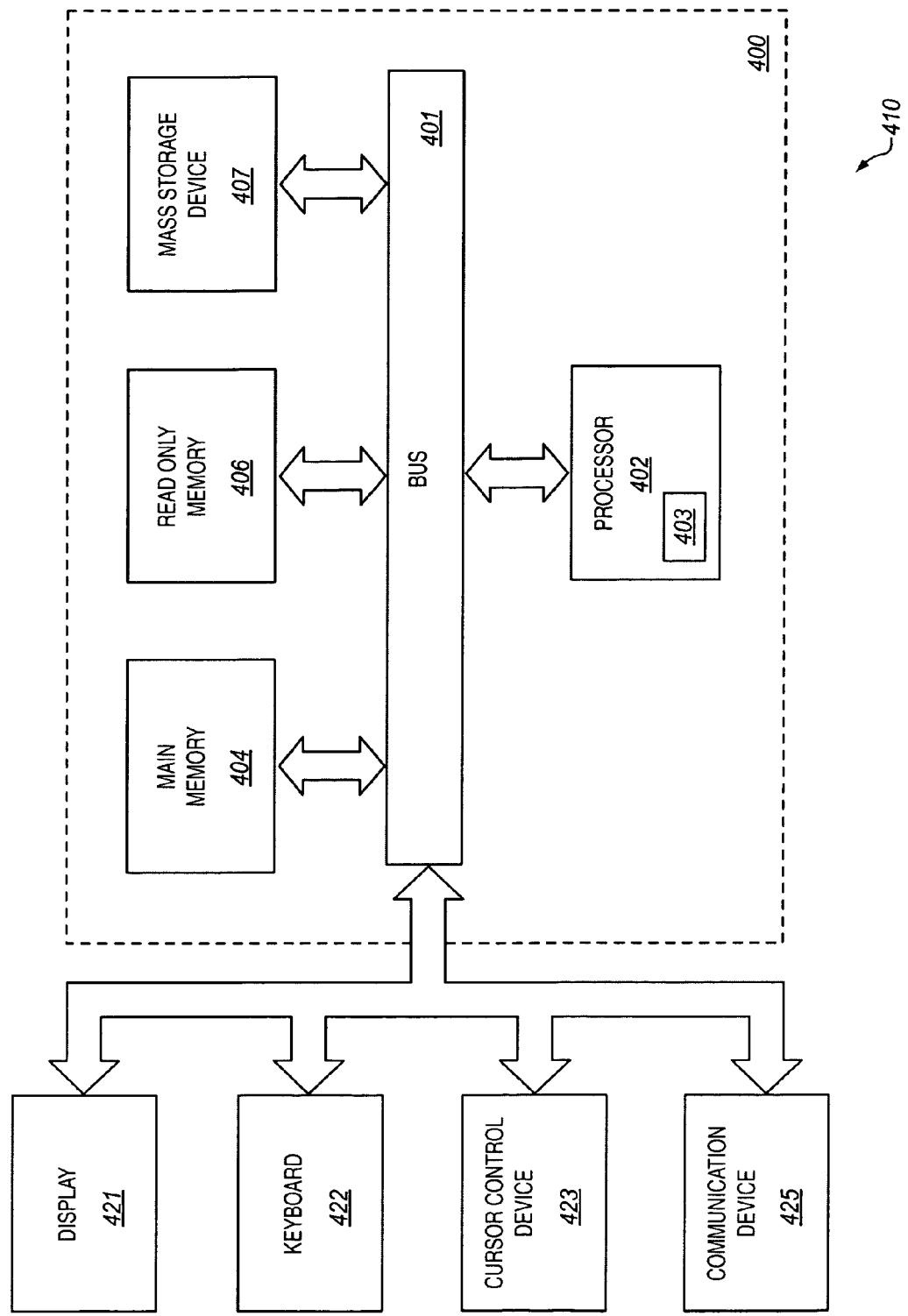
FIG. 4A is a block diagram of a computer system in which one embodiment of the present invention may be implemented.

FIG. 4A illustrates a computer system 400 representing an exemplary target system in which features of the present invention may be implemented. Computer system 400 comprises a bus or other communication means 401 for communicating information, and a processing means such as processor 402 coupled with bus 401 for processing information. The processor 402 comprises a novel branch prediction circuit 403 that will be described further below.

Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402.

A data storage device 407 such as a magnetic disk or optical disc and its corresponding drive may also be coupled to computer system 400 for storing information and instructions. Computer system 400 can also be coupled via bus 401 to a display device 421, such as a cathode ray tube (CRT) or Liquid Crystal Display (LCD), for displaying information to an end user. For example, graphical and/or textual indications of installation status, time remaining in the trial period, and other information may be presented to the prospective purchaser on the display device 421. Typically, an alphanumeric input device 422, including alphanumeric and other keys, may be coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 is also coupled to bus 401. The communication device 425 may include a modem, a network interface card, or other well-known interface devices, such as those used for coupling to Ethernet, token ring, or other types of physical attachment for purposes of providing a communication link to support a local or wide area network, for example. In any event, in this manner, the computer system 400 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 400 will vary from implementation to implementation depending upon numerous factors, such as price constraints, performance requirements, technological improvements, and/or other circumstances.

It should be noted that, while the steps described herein may be performed under the control of a programmed processor, such as processor 402, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a particular embodiment wherein the recited steps are performed by a specific combination of hardware components.

Figure 4B:
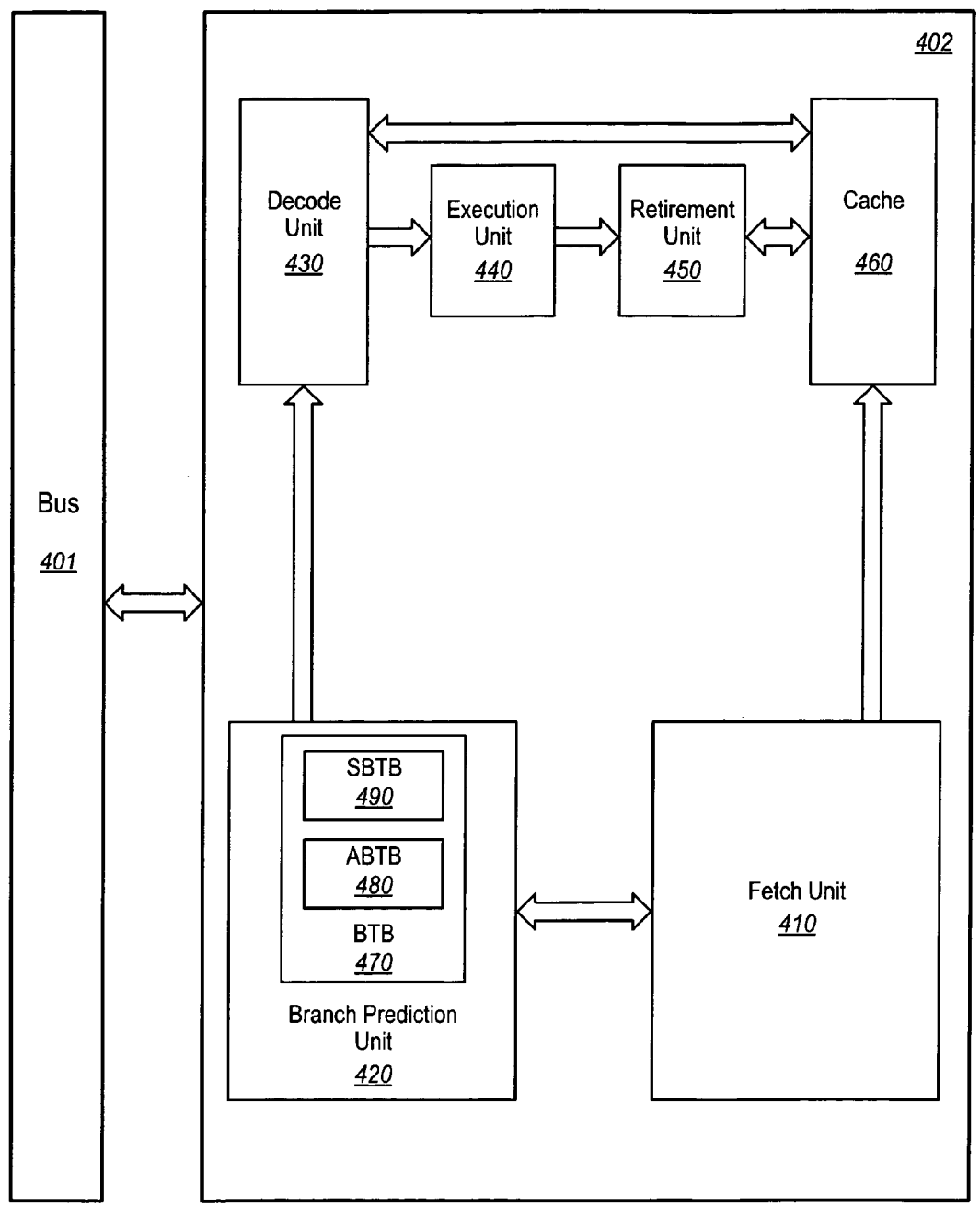
FIG. 4B is a simplified block diagram of various microprocessor units that may interact with the branch prediction circuit of the present invention.

FIG. 4B is a simplified block diagram of processor 402 including various units that may interact with the branch prediction circuit of the present invention. In this example, the processor 402 includes a fetch unit 410, a branch prediction circuit 420, a decode unit 430, an execution unit 440, a retirement unit 450, and a cache 460. The fetch unit 410 retrieves instructions from cache and uses the instruction pointer (IP) to continuously fetch based on the signals received from the branch prediction circuit 420. In this example, the branch prediction circuit 420 includes a novel branch target buffer (BTB) 470 comprising a speculative branch target buffer (SBTB) 490 and an architectural branch target buffer 480. The branch prediction circuit 420 identifies branches and predicts whether or they will be taken based upon branch data contained in the SBTB 490 and the ABTB 480 as will be described further below. The SBTB 490 includes a plurality of branch entries (not shown) to maintain speculative branch data associated with in-flight branches thereby reducing the burden on the ABTB 480 and allowing the ABTB 480 to track only architectural branch data, such as the actual (fully-resolved) taken/not-taken history associated with retired conditional branches.

Returning to the fetch unit 410, the fetching process of the fetch unit 410 is interrupted if a branch is encountered, because the next instruction following the branch needs to be resolved before further instructions can be fetched. The branch prediction circuit 420 predicts the target address of the branch instruction based upon whether or not the branch is predicted as taken. The branch prediction circuit 420 provides this address to the fetch unit 410 to allow the fetch unit 410 to continue fetching instruction data.

The predicted target address is forwarded to the decode unit 430. The decode unit 430 verifies each branch prediction and decodes each branch instruction. While verifying the results of the branch prediction, the decode unit 503 may deallocate any bogus branches that it detects. A bogus branch is one predicted by the branch prediction circuit 420 at a location where no branch instructions exist.

The execution unit 440 then executes the branch instruction. The execution unit 440 compares the predicted branch target with the actual branch target, and hence may determine whether the branch was correctly predicted. The execution unit 440 may corrects any mispredicted branches or mispredicted targets by flushing the head of the pipeline and updating the corresponding branch entry in the SBTB 490.

Finally, the retirement unit 450 retires each branch instruction. According to one embodiment, branch data may be updated at this point by stalling the prediction pipeline and writing back a line to the ABTB 480 when the last branch in the line retires. By updating branch data only when the last of the branches in the line has retired, update traffic to the ABTB 480 is reduced thus making it possible to implement the ABTB 480 as a single-ported cache. Additionally, branch updating during retirement eliminates BTB corruption that may result from prior art update mechanisms that attempt to update the BTB at execution time. While such update mechanisms may improve prediction, corruption of the BTB may result since not all executed branches actually retire.

Branch Prediction Circuit

Figure 5:
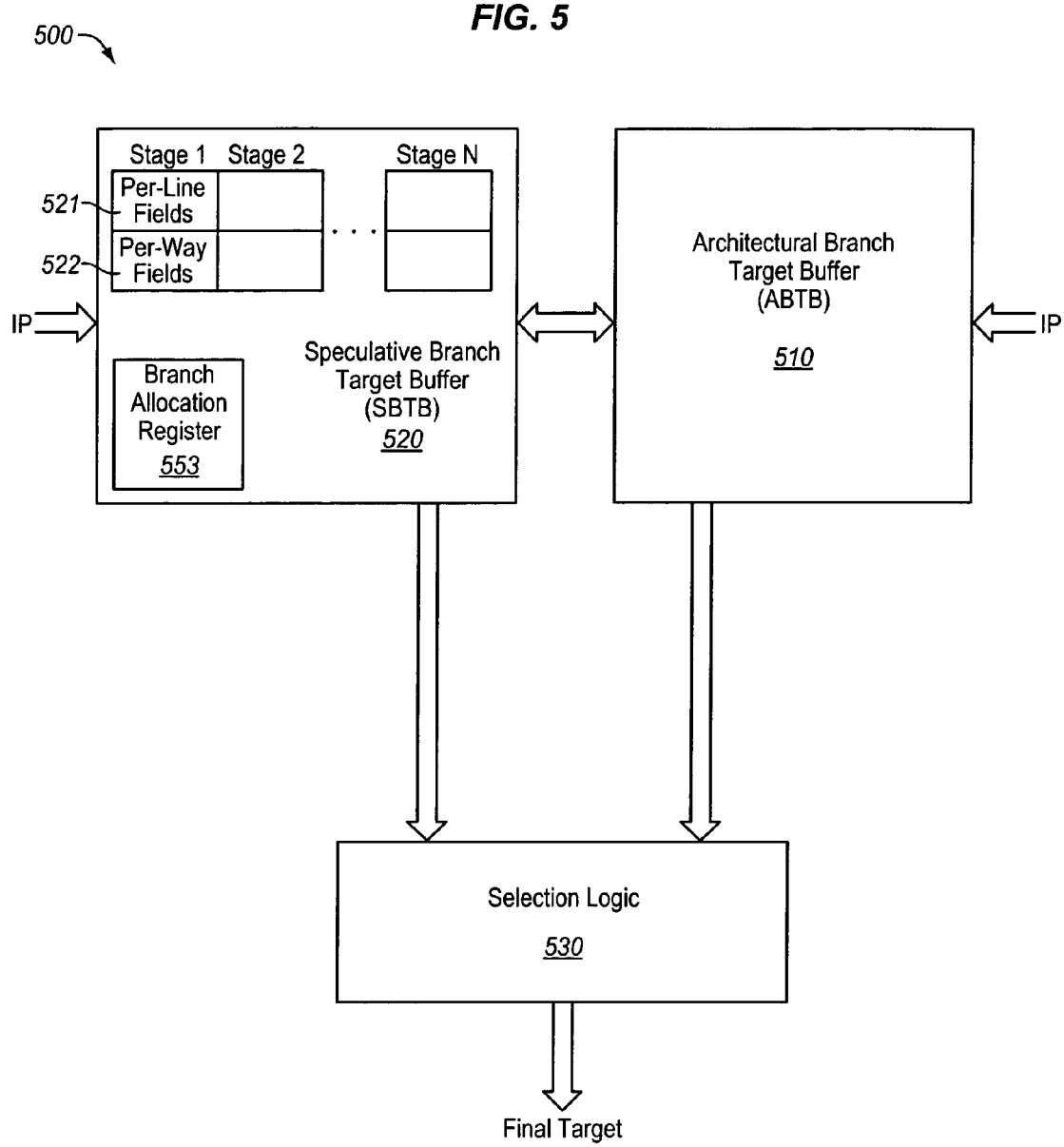
FIG. 5 is a simplified block diagram of a branch prediction circuit according to one embodiment of the present invention.

FIG. 5 is a simplified block diagram of a branch prediction circuit 500 according to one embodiment of the present invention. In the embodiment depicted, the branch prediction circuit 500 includes an architectural branch target buffer (ABTB) 510, a speculative branch target buffer (SBTB) 520, and selection logic 530. According to one embodiment, the SBTB 520 is a relatively small structure supporting the ABTB 510. The SBTB 520 is used to maintain the speculative branch data for in-flight branches, meaning fetched branches that are not yet retired. In the embodiment depicted, the SBTB includes an N stage FIFO, where N is the number of stages in the processor's instruction pipeline and a branch allocation register-553. Each stage of the FIFO includes per-line fields 521 and per-way fields 522.

Per-line fields 521 include a set field, a pattern table, least recently replaced (LRR) bits, a BAR index, and a sequential set indication. The set field identifies the set number. In this manner, all entries of the SBTB 520 may search in parallel to see whether the set matches the IP. The pattern table is typically updated at retirement. However, it may be updated at prediction if deemed worthwhile for prediction accuracy. The LRR bits point to the entry to be replaced if necessary. Preferably, entries outside the line, or outside the execution path are selected if possible. The BAR indication indicates the branch allocation register used for allocation or that there is no allocation. If there is an allocation, the LRR bits indicate the entry being replaced. This is used for any subsequent predictions. The sequential set indication indicates whether the next set is a sequential set. This is used to deallocate entries in the next set in the case of a bogus branch.

Per-way fields 522 include a valid indication, an order field, a speculative bit, history information, and a prediction field. The valid indication indicates whether or not the branch is valid. This bit is set on allocation and cleared on deallocation. The order field indicates the order of the branch offsets from lowest to highest. The speculative bit indicates that the branch was speculatively updated. This bit is cleared when updated at retirement. It is also used to deallocate the line when the last branch is updated. History information contains the latest history copies from the ABTB or the SBTB. This allows the pattern table to be updated at retirement. Finally, the prediction bit represents the prediction. The prediction bit is concatenated with the last 3 history bits to form the history to be used for the next prediction.

Branch allocation registers each include an indication of the type of branch being allocated, the tag of the branch, the offset of the branch, and history to be initialized based upon the type.

Because the SBTB 520 is read/written during the decode stage for allocation of branch entries, during the execution stage for speculative update of branch entries, and during the retirement stage to correct branch entries, it is preferable to implement the SBTB 520 as a dual-ported memory.

The ABTB 510 need only be read during branch prediction and written when branches in the SBTB 520 have retired. Consequently, the ABTB 510 may be implemented with a single read port and a single write port. Alternatively, the ABTB 510 may be implemented as a single-ported memory in which reading and writing occur over the same shared port.

Selection logic 530 selects between the ABTB output and the SBTB output, depending upon which one of the two contains the youngest entry.

Branch Entry Processing

Figure 6:
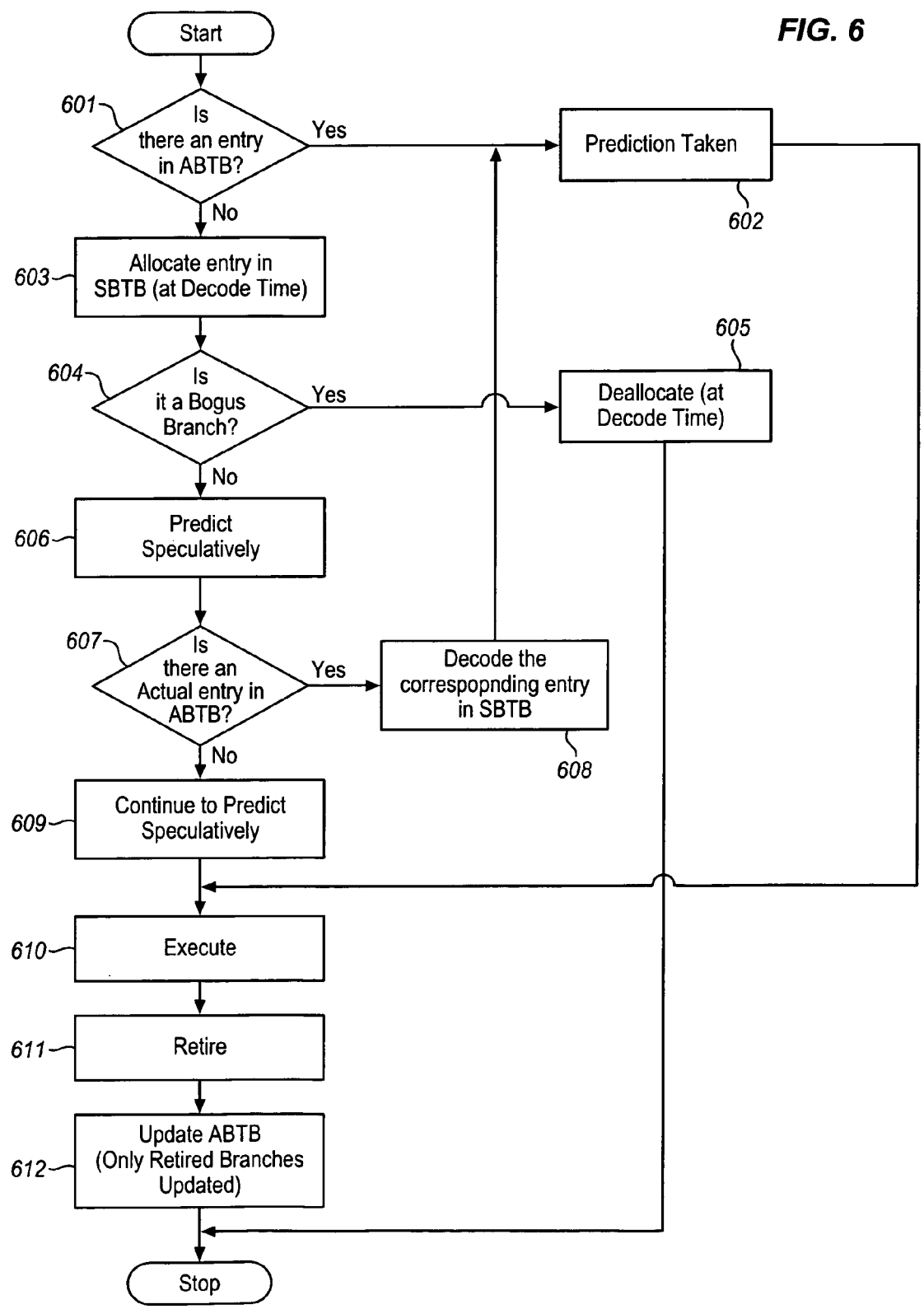
FIG. 6 is a flow diagram illustrating branch entry processing according to one embodiment of the present invention.

FIG. 6 is a flow diagram illustrating branch entry processing according to one embodiment of the present invention. When no entry is found in the ABTB 601, an entry is allocated in the SBTB at decode time 603. When an entry is found in the ABTB, a prediction is taken at 602. In case of a bogus branch 604, deallocation is performed at decode time 605, else the branch is predicted speculatively 606. The speculative prediction continuous 606, assuming the prediction is correct, for the subsequent entries until an actual entry in found in the ABTB 607. Once there is an actual entry in the ABTB, any corresponding entry in the SBTB is decoded in order to avoid duplication 608. If no actual entry is found in the ABIB, speculative prediction continues at 609. Any mispredicted branches and mispredicted targets are corrected at execute time, and entries are later executed 610. Finally, the executed branch instructions are retired 611. The branch history and PT are updated, but only branches that actually retire update the ABTB at 612. Since not all executed branches retire, branch update at Retire time eliminates corruption.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

speculatively allocating a first branch entry for a conditional branch in a speculative branch target buffer (SBTB) prior to execution of the conditional branch responsive to decoding the conditional branch and finding no branch entry in an architectural branch target buffer (ABTB) corresponding to the conditional branch, wherein the SBTB and the ABTB are included in a branch target buffer (BTB) to eliminate a speculative history from the ABTB;

speculatively allocating a second branch entry for the conditional branch in the SBTB responsive to a subsequent failed attempt to locate a branch entry in the ABTB corresponding to the conditional branch;

allocating a third branch entry for the conditional branch in the ABTB after retirement of the conditional branch; and subsequently performing branch prediction for the conditional branch by determining a predicted target address branch based upon branch data associated with the second branch entry.

2. The method of claim 1, further comprising speculatively updating branch data associated with the first branch entry after the performing branch prediction for the conditional branch.

3. The method of claim 2, wherein the branch data includes a speculative history field representing the speculative taken or not-taken history of the branch for a predetermined window of executions of the branch, and wherein the speculatively updating branch data comprises updating the speculative history field to reflect the taken or not-taken status of its most recent execution.

4. A machine-readable medium having stored thereon data representing sets of instructions, the sets of instructions which, when executed by a machine, cause the machine to:

speculatively allocate a first branch entry for a conditional branch in a speculative branch target buffer (SBTB) prior to execution of the conditional branch responsive to decoding the conditional branch and finding no branch entry in an architectural branch target buffer (ABTB) corresponding to the conditional branch, wherein the SBTB and the ABTB are included in a branch target buffer (BTB) to eliminate a speculative history from the ABTB;

speculatively allocate a second branch entry for the conditional branch in the SBTB responsive to a subsequent failed attempt to locate a branch entry in the ABTB corresponding to the conditional branch;

allocate a third branch entry for the conditional branch in the ABTB after retirement of the conditional branch; and subsequently perform branch prediction for the conditional branch by determining a predicted target address branch based upon branch data associated with the second branch entry.

5. The machine-readable medium of claim 4, wherein the sets of instructions which, when executed by the machine, further cause the machine to speculatively update branch data associated with the first branch entry after the performing branch prediction for the conditional branch.

6. The machine-readable medium of claim 5, wherein the branch data includes a speculative history field representing the speculative taken or not-taken history of the branch for a predetermined window of executions of the branch, and wherein the speculatively updating branch data comprises updating the speculative history field to reflect the taken or not-taken status of its most recent execution.

7. A processor, comprising:
  a fetch unit to speculatively retrieve instruction data for processing by an instruction pipeline; and
  a branch prediction circuit, coupled to the fetch unit, to predict final target addresses for branch instructions contained within the instruction data, the branch prediction circuit including
    a branch target buffer (BTB), the BTB having
      a speculative branch target buffer (SBTB) cache having a plurality of branch entries to maintain speculative branch data associated with in-flight branches, the speculative branch data including a speculative history of taken/not-taken outcomes associated with the in-flight branches, and
      an architectural branch target buffer (ABTB) cache, coupled to the SBTB cache, the ABTB having a plurality of branch entries to maintain architectural branch data including the actual taken/not-taken outcomes associated with retired conditional branches, wherein the SBTB and the ABTB are included in the BTB to eliminate the speculative history from the ABTB.

8. The processor of claim 7, wherein the SBTB cache comprises a FIFO having entries corresponding to each of a plurality of pipeline stages of the instruction pipeline.

9. The processor of claim 7, wherein the SBTB cache comprises a dual-ported SBTB cache.

10. The processor of claim 7, wherein the SBTB cache comprises a single-ported SBTB cache.

11. The processor of claim 7, wherein the ABTB cache comprises a single-ported ABTB cache.

12. A branch prediction circuit, comprising:
  a branch target buffer (BTB), the BTB having
    a speculative branch target buffer (SBTB) cache having a plurality of branch entries to maintain speculative branch data associated with in-flight branches, the speculative branch data including a speculative history of taken/not-taken outcomes associated with the in-flight branches, wherein the SBTB cache includes a FIFO having entries corresponding to each of a plurality of pipeline stages of a processor instruction pipeline, and
    an architectural branch target buffer (ABTB) cache coupled to the SBTB cache, the ABTB cache having a plurality of branch entries to maintain architectural branch data including actual taken/not-taken outcomes associated with retired conditional branches, wherein the SBTB and the ABTB are included in the BTB to eliminate the speculative history from the ABTB; and
  a target address generator coupled to the BTB, the target address generator to determine a predicted target address for a branch prediction based upon the speculative branch data and the architectural branch data.

13. The branch prediction circuit of claim 12, further comprises a fetch unit to speculatively retrieve instruction data for processing by the processor instruction pipeline.

14. The branch prediction circuit of claim 12, wherein the SBTB cache comprises a dual-ported cache.

15. The branch prediction circuit of claim 12, wherein the SBTB cache comprises a single-ported cache.

16. The branch prediction circuit of claim 12, wherein the ABTB cache comprises a single-ported cache.

17. A method, comprising:
  maintaining speculative branch data associated with in-flight branches using a speculative branch target buffer (SBTB) cache having a plurality of branch entries, the speculative branch data including a speculative history of taken/not-taken outcomes associated with the in-flight branches, wherein the SBTB cache includes a FIFO having entries corresponding to each of a plurality of pipeline stages of a processor instruction pipeline;
  maintaining architectural branch data using a plurality of branch entries of an architectural branch target buffer (ABTB) cache coupled to the SBTB cache, the architectural branch data including the actual taken/not-taken outcomes associated with retired conditional branches, wherein the SBTB and the ABTB are included in a branch target buffer (BTB) to eliminate the speculative history from the ABTB; and
  determining predicted target address for a branch prediction based upon the speculative branch data and the architectural branch data, the determining of the predicted target address is performed using a target address generator coupled to the SBTB cache and the ABTB cache.

18. The method of claim 17, further comprises a fetch unit to speculatively retrieve instruction data for processing by the processor instruction pipeline.

19. The method of claim 17, wherein the SBTB cache comprises a dual-ported cache.

20. The method of claim 17, wherein the SBTB cache comprises a single-ported cache.

21. The method of claim 17, wherein the ABTB cache comprises a single-ported cache.

* * * * *